US008600389B2

(12) United States Patent
Deng et al.

(10) Patent No.: US 8,600,389 B2
(45) Date of Patent: Dec. 3, 2013

(54) METHOD AND APPARATUS FOR CONTROLLING USER EQUIPMENT'S RESIDING IN A CELL

(71) Applicant: Huawei Technologies Co., Ltd., Shenzhen (CN)

(72) Inventors: Mingyi Deng, Shenzhen (CN); Xu Tian, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/729,683

(22) Filed: Dec. 28, 2012

(65) Prior Publication Data

US 2013/0115951 A1     May 9, 2013

Related U.S. Application Data

(63) Continuation of application No. PCT/CN2011/075671, filed on Jun. 13, 2011.

(30) Foreign Application Priority Data

Jun. 30, 2010 (CN) .......................... 2010 1 0218681

(51) Int. Cl.
    *H04W 36/00*         (2009.01)
    *H04W 4/00*           (2009.01)

(52) U.S. Cl.
    USPC ........... 455/436; 455/437; 455/438; 455/439; 455/442; 455/443; 455/444; 370/331; 370/332

(58) Field of Classification Search
    USPC ............................ 455/436–444; 370/331–333
See application file for complete search history.

(56) References Cited

U.S. PATENT DOCUMENTS

| 6,104,936 A | 8/2000 | Kronestedt |
| 2006/0171358 A1* | 8/2006 | Kangas et al. ................ 370/331 |

(Continued)

FOREIGN PATENT DOCUMENTS

| CN | 1430429 A | 7/2003 |
| CN | 101370306 A | 2/2009 |

(Continued)

OTHER PUBLICATIONS

Chinese Patent No. 101888639, issued on Apr. 24, 2013, granted in corresponding Chinese Patent Application No. 201010218681.0.

(Continued)

*Primary Examiner* — Jinsong Hu
*Assistant Examiner* — Dung Hong
(74) *Attorney, Agent, or Firm* — Brinks Gilson & Lione

(57) ABSTRACT

Embodiments of the present invention disclose a method and an apparatus for controlling user equipment's residing in a cell. With the embodiments, a base station of a virtual cell transmits a signal including common channel information, a frequency of the signal of the virtual cell is the same as a frequency of a signal transmitted by a base station of a source cell, the common channel information includes a pilot, a location area code and an inter-frequency reselection threshold, or includes a pilot and a location area code, and the content of the common channel information guides user equipment to reside in a target cell through reselection or through location update. Moreover, according to the embodiments, the co-channel interference caused by the signal onto the source cell is small, and the interference onto normal services of the source cell is reduced. Massive configuration in the source cell is also avoided.

16 Claims, 3 Drawing Sheets

(56) References Cited

U.S. PATENT DOCUMENTS

| | | |
|---|---|---|
| 2008/0056190 A1* | 3/2008 | Kim ............................ 370/331 |
| 2009/0092096 A1 | 4/2009 | Czaja et al. |
| 2009/0238117 A1 | 9/2009 | Somasundaram et al. |
| 2010/0172288 A1* | 7/2010 | Vachhani ..................... 370/328 |
| 2010/0267378 A1* | 10/2010 | Hamabe et al. .............. 455/423 |

FOREIGN PATENT DOCUMENTS

| | | |
|---|---|---|
| CN | 101447802 A | 6/2009 |
| CN | 101888639 A | 11/2010 |
| WO | WO 2009060935 A1 * | 5/2009 |
| WO | WO 2010/009159 A1 | 1/2010 |
| WO | WO 2010/025937 A1 | 3/2010 |

OTHER PUBLICATIONS

Written Opinion of the International Searching Authority issued in corresponding PCT Patent Application No. PCT/CN2011/075671, mailed Sep. 15, 2011.

International Search Report issued in corresponding PCT Patent Application No. PCT/CN2011/075671, mailed Sep. 15, 2011.

* cited by examiner

METHOD AND APPARATUS FOR CONTROLLING USER EQUIPMENT'S RESIDING IN A CELL

CROSS-REFERENCE TO RELATED APPLICATIONS

This application is a continuation of International Application No. PCT/CN2011/075671, filed on Jun. 13, 2011, which claims priority to Chinese Patent Application No. 201010218681.0, filed on Jun. 30, 2010, both of which are hereby incorporated by reference in their entirety.

FIELD OF THE INVENTION

The present invention relates to the field of communication technologies and, in particular, to a method and an apparatus for controlling user equipment's residing in a cell.

BACKGROUND OF THE INVENTION

The 3rd generation mobile communication system has been applied commercially around the world. With the increase of users, traffic is increasing, and users raise higher requirements on quality of service provided by the 3rd generation mobile communication network. In existing mobile services, obstacles such as indoor walls lead to signal loss, and indoor signals of user equipment (user equipment, User's Equipment) are of low quality, which reduces user communication quality.

To solve these problems, a Femtocell (Femtocell) base station technology is introduced. A Femtocell base station is set at a user's home, which saves operation costs of equipment room, power supply, air conditioners, and circuit maintenance and provides good indoor coverage. The Femtocell base station has a small coverage radius, and terminals connected to it decrease its transmit power, which saves batteries and reduces radiation to the human body. However, introducing many Femtocell base stations brings new problems to existing macro cells, for example, interference caused by signals transmitted by the Femtocell base station onto the macro cells, and handover between a macro cell and a cell that covers the Femtocell base station. To reduce the interference caused by the signals transmitted by the Femtocell base station onto the macro cell, most networking schemes in the prior art recommend inter-frequency networking of Femtocell and macro networks. However, inter-frequency networking may make user equipment in an area with good macro cell signals unable to reselect a Femtocell. If the user equipment is forced to search for inter-frequency neighboring cells, it will make the user equipment consume too much power. Moreover, to implement reselection from a macro cell to a Femtocell, a cell generated by signals transmitted by multiple different Femtocell base stations needs to be configured to each macro cell as its neighboring cell. Such factors become big bottlenecks of deploying Femtocell base stations massively.

Specifically, in the prior art, a pseudo pilot technology may be used, which guides the user equipment to hand over from a macro cell to a Femtocell. Specifically, it is assumed that base station A is a macro cell base station and base station B is a Femtocell base station, and a mobile station roams to base station A and uses carrier F2 for communication. When the mobile station is gradually away from base station A and closer to base station B, base station B has only carrier F1 that is available. The F2 signals received by the mobile station from base station A are weaker and weaker, but the F1 signals of base station B are stronger and stronger. Meanwhile, base station B transmits pseudo pilots on carrier F2. The pseudo pilots have only energy, but never provide traffic channels. That is, the pseudo pilots cannot be parsed. When the mobile station is served by base station A of carrier F2 and moves from base station A to base station B, the mobile station keeps detecting pilot signal strength of nearby base stations. When the value of a pilot adding threshold (T_ADD) parameter exceeds a threshold, the mobile station sends a pilot strength measuring message (PSMM, Pilot Strength Measuring Message) to base station A proactively. After receiving the message, base station A queries configuration information of neighboring base stations, and finds that pilot signals of F2 of base station B are actually pseudo pilot signals. The pseudo pilot signals are interfering signals that cannot be parsed, but F1 of base station B can provide service channels. Base station A sends an extended handoff direction message (EHDM, Extended Hand-off Direction Message) to the mobile station, whereby the mobile station is instructed to hand over to carrier F1 and handover parameters are sent to the mobile station. The mobile station promptly hands over to carrier F1 of base station A, and then hands over from carrier F1 of base station A to carrier F1 of base station B in a soft handover manner, thereby ensuring smooth handover.

In the process of researching and practicing the prior art, the inventors of the present invention find that in the method for reselecting a cell according to the pseudo pilot, the signals transmitted by base station B and including pseudo pilots generate co-channel interference onto the cell formed by coverage of base station A. The signals that transmit pseudo pilots are very strong, and the pseudo pilots are not capable of providing services, but carry noise signals of enormous energy, which makes the user equipment initiate inter-frequency measurement. Therefore, in the prior art, the co-channel interference increases, which deteriorates the communication environment of the cell and affects the users who use services normally in the cell. Meanwhile, the electric quantity consumed by inter-frequency measurement initiated by the user equipment increases, which increases the user equipment's radiation onto the human body.

Further, much information on Femtocells (base station Bs given above as examples) adjacent to the macro cell, such as pseudo pilot signals transmitted by neighboring Femtocell base stations and pilots capable of providing services in the neighboring Femtocells, needs to be configured in base station A in the macro cell. Such information imposes heavier base station configuration loads in the macro cell and hinders base station equipment management in the macro cell.

SUMMARY OF THE INVENTION

Embodiments of the present invention provide a method and an apparatus for controlling user equipment's residing in a cell, so as to control user equipment to reside into a target cell, reduce co-channel interference onto a source cell, and avoid massive configuration of base station equipments in the source cell.

A method for controlling user equipment's residing in a cell, which is applied in a communication system including a source cell, a virtual cell, and a target cell, includes:

transmitting, by a base station of the virtual cell, a first signal including first common channel information at a first frequency, where the first frequency is the same as a frequency of a signal transmitted by a base station of the source cell, the first frequency is different from a frequency of a signal transmitted by a base station of the target cell, and a scrambling code of the first signal is different from a scrambling code of the signal transmitted by the base station of the source cell; and the first common channel information at least includes a pilot, a location area code, and inter-frequency reselection threshold, so that the user equipment performs intra-frequency cell reselection according to the pilot in the first common channel information until the virtual cell is reselected, and so that the user equipment performs inter-frequency cell reselection according to the inter-frequency reselection threshold in the first common channel information until the target cell is reselected if the user equipment determines that the location area code is the same as a location area code of the source cell and a location area code of the target cell.

A method for controlling user equipment's residing in a cell, which is applied in a communication system including a source cell, a virtual cell, and a target cell, includes:

transmitting, by a base station of the virtual cell, a second signal including second common channel information at a second frequency, where the second frequency is the same as a frequency of a signal transmitted by a base station of the source cell, the second frequency is different from a frequency of a signal transmitted by a base station of the target cell, and a scrambling code of the second signal is different from a scrambling code of the signal transmitted by the base station of the source cell;

the second common channel information at least includes a pilot and a location area code, so that the user equipment performs intra-frequency cell reselection according to the pilot in the second common channel information until the virtual cell is reselected, and so that the user equipment sends a first radio resource control connection request to the base station of the virtual cell if the user equipment determines that the location area code is different from a location area code of the source cell;

receiving, by the base station of the virtual cell, the first radio resource control connection request sent by the user equipment; and sending a response that refuses to create a radio resource control connection with the user equipment according to preset information about rejecting the radio resource control connection, where the response further includes target cell information, and the target cell information serves as an instruction of updating the user equipment's location to the target cell.

An apparatus for controlling user equipment's residing in a cell, which is applied in a communication system including a source cell and a target cell, includes:

a first transmitting unit, configured to transmit a first signal including first common channel information at a first frequency, where the first frequency is the same as a frequency of a signal transmitted by a base station of the source cell, the first frequency is different from a frequency of a signal transmitted by a base station of the target cell, and a scrambling code of the first signal is different from a scrambling code of the signal transmitted by the base station of the source cell; and the first common channel information at least includes a pilot, a location area code, and inter-frequency reselection threshold, so that the user equipment performs intra-frequency cell reselection according to the pilot in the first common channel information until a cell formed by an area covered by the first signal sent by the apparatus is reselected, and so that the user equipment performs inter-frequency cell reselection according to the inter-frequency reselection threshold in the first common channel information until the target cell is reselected if the user equipment determines that the location area code is the same as a location area code of the source cell and a location area code of the target cell.

An apparatus for controlling user equipment's residing in a cell, which is applied in a communication system including a source cell and a target cell, includes:

a second transmitting unit, configured to transmit a second signal including second common channel information at a second frequency, where the second frequency is the same as a frequency of a signal transmitted by a base station of the source cell, the second frequency is different from a frequency of a signal transmitted by a base station of the target cell, and a scrambling code of the second signal is different from a scrambling code of the signal transmitted by the base station of the source cell;

the second common channel information at least includes a pilot and a location area code, so that the user equipment performs intra-frequency cell reselection according to the pilot in the second common channel information until a cell formed by an area covered by the second signal sent by the apparatus is reselected, and so that the user equipment sends a first radio resource control connection request to the apparatus if the user equipment determines that the location area code is different from a location area code of the source cell;

a first receiving unit, configured to receive the first radio resource control connection request sent by the user equipment; and a first sending unit, configured to send a response that refuses to create a radio resource control connection with the user equipment according to preset information about rejecting the radio resource control connection, where the response further includes target cell information, and the target cell information serves as an instruction of updating the user equipment's location to the target cell.

In the embodiments of the present invention, a base station of a virtual cell transmits a signal including common channel information, a frequency of the signal of the virtual cell is the same as a frequency of a signal transmitted by a base station of a source cell, the common channel information includes a pilot, a location area code and an inter-frequency reselection threshold, or the common channel information includes a pilot and a location area code, and the content of the common channel information guides user equipment to reside in a target cell through reselection or through location update. Moreover, in the embodiments of the present invention, a signal including common channel information is employed. Because this signal is a broadcast signal and is different from a pseudo pilot, the co-channel interference caused by the signal onto the source cell is small, and the interference onto normal services of the source cell is reduced. Massive configuration of base stations in the source cell is also avoided.

BRIEF DESCRIPTION OF THE DRAWINGS

To describe the technical solutions in the embodiments of the present invention more clearly, the following outlines the accompanying drawings to be used in the description of the embodiments of the present invention. Apparently, the accompanying drawings outlined below are only some of the embodiments of the present invention, and persons of ordinary skill in the art can derive other drawings from them without making any creative effort.

DETAILED DESCRIPTION OF THE EMBODIMENTS

Embodiments of the present invention provide a method and an apparatus for controlling user equipment's residing in a cell, which are detailed below respectively.

Figure 1:
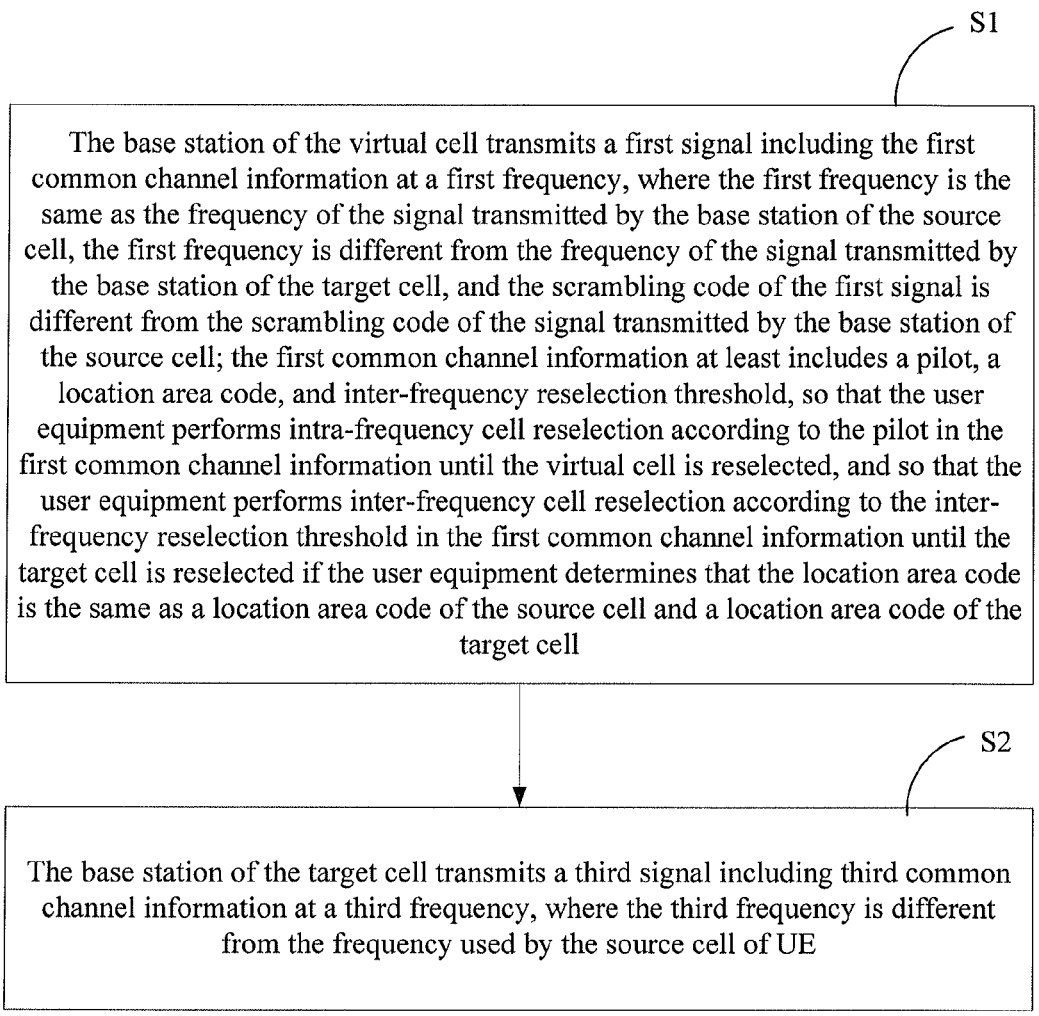
FIG. 1 is a flowchart of a method for controlling user equipment's residing in a cell according to an embodiment of the present invention.

FIG. 1 is a flowchart of a method for controlling user equipment's residing in a cell according to an embodiment of the present invention. This method applies to a communication system including a source cell, a virtual cell and a target cell. According to this method, a base station of the virtual cell transmits a first signal including first common channel information at a first frequency, where the first frequency is the same as a frequency used by a signal transmitted by a base station of the source cell, and a scrambling code of the first signal is different from a scrambling code of the signal transmitted by the base station of the source cell. After receiving the first signal, the user equipment can identify the virtual cell. However, the virtual cell cannot provide any service for the user equipment, and the base station of the virtual cell is the same as or different from the base station of the target cell. If they are different, the two base stations may share a site. Sharing a site here means that the center location of the cell covered by one base station is the same as or similar to the center location of the cell covered by the other base station. A transmitted signal of the base station of the virtual cell may be different from a transmitted signal of the base station of the target cell. The frequency used by the signal transmitted by the base station of the target cell is different from the frequency used by the signal transmitted by the base station of the source cell, and the base station of the target cell can provide services for the user equipment that accesses the target cell. When the user equipment enters the virtual cell from the source cell, because the virtual cell and the target cell share a site, entering the coverage of the virtual cell is probably equivalent to entering the coverage of the target cell. Because the coverage of the virtual cell may overlap the coverage of the target cell, the user equipment may perform intra-frequency measurement first to reselect the virtual cell, and then perform inter-frequency cell reselection according to the signal transmitted by the base station of the virtual cell, so as to make the user equipment reselect and reside in the target cell. For ease of understanding, the source cell mentioned above may be understood as a macro cell, the target cell may be understood as a Femtocell, and the user equipment entering a target cell from a source cell may be understood as entering a Femtocell from a macro cell. The following describes the method in FIG. 1 in detail. The method includes the following steps:

Step S1: The base station of the virtual cell transmits a first signal including the first common channel information at a first frequency, where the first frequency is the same as the frequency of the signal transmitted by the base station of the source cell, the first frequency is different from the frequency of the signal transmitted by the base station of the target cell, and the scrambling code of the first signal is different from the scrambling code of the signal transmitted by the base station of the source cell; the first common channel information at least includes a pilot, a location area code, and inter-frequency reselection threshold, so that the user equipment performs intra-frequency cell reselection according to the pilot in the first common channel information until the virtual cell is reselected, and so that the user equipment performs inter-frequency cell reselection according to the inter-frequency reselection threshold in the first common channel information until the target cell is reselected if the user equipment determines that the location area code is the same as a location area code of the source cell and a location area code of the target cell.

In step S1, the base station of the virtual cell provides no service for the user equipment that accesses the virtual cell. The first common channel information in the first signal transmitted by the base station of the virtual cell may specifically include: common pilot channel (CPICH, Common Pilot Channel), subordinate common control physical channel (SCCPCH, Subordinate Common Control Physical Channel), primary common control physical channel (PCCPCH, Principal Common Control Physical Channel), synchronization channel (SCH, Synchronous Channel), packet random access channel (PRACH, Packet Random Access Channel), acquisition indication channel (AICH, Acquisition Indication Channel), and so on.

The first signal transmitted by the base station of the virtual cell is a broadcast signal, and all user equipment in the virtual cell can receive the first signal. The user equipment that receives the first signal can identify the virtual cell according to the fact that the scrambling code of the first signal is different from the scrambling code of the signal transmitted by the base station of the source cell. The user equipment measures the pilot in the received first common channel information according to the pilot in the first common channel information in the first signal, and performs intra-frequency cell reselection according to preset intra-frequency reselection rules. The operation of cell reselection in the user equipment may be: The user equipment performs intra-frequency cell measurement. In the embodiment of the present invention, the user equipment sets the virtual cell as a serving cell, and the operation of reselecting the virtual cell is completed as soon as the setting is complete. The user equipment sets up a connection with the virtual cell when the user equipment has a service to handle.

According to the location area code in the first common channel information in the first signal, the user equipment judges whether the location area code is the same as the location area code of the source cell and the location area code of the target cell. If determining that the source cell, the virtual cell and the target cell have the same location area code, the user equipment finishes the operation of residing in the target cell as soon as the user equipment finishes the operation of reselecting the target cell because the location area codes are the same. Specifically, the user equipment may perform inter-frequency cell reselection according to the inter-frequency reselection threshold in the first common channel information. In the embodiment of the present invention, by setting the target cell as a serving cell, the user equipment finishes reselecting the target cell, that is, finishes residing in the target cell.

Specifically, the operation of determining whether to perform inter-frequency cell reselection according to the reselection threshold may be: The user equipment judges whether the strength of the received signal is less than the reselection threshold, and, if the received signal is less than the reselection threshold, performs inter-frequency cell reselection.

Note that the base station of the source cell needs to set the virtual cell as a neighboring cell of the source cell. When the user equipment performs reselection measurement, the user equipment may reselect the virtual cell if it is found that the signal of the virtual cell is better.

The method may further include:

Step S2: The base station of the target cell transmits a third signal including third common channel information at a third frequency, where the third frequency is different from the frequency used by the source cell. This step is given for ease of understanding the technical solution in the embodiment of the present invention, but is not an indispensible step for solving the technical problems of the embodiment of the present invention.

With the base station of the target cell transmitting the third signal including the third common channel information at the third frequency, the cell formed by coverage of the third signal can provide services for the user equipment in the coverage.

Both the first signal and the third signal are broadcast signals, and are receivable by all user equipments in the coverage of the base station of the target cell. The base station of the target cell may be the same as or different from the base station of the virtual cell. The virtual cell and the target cell may share a site.

The base station of the virtual cell or the base station of the target cell is a Femtocell base station or a home base station; and the source cell may be a macro cell.

When the user equipment enters a virtual cell from a source cell, the user equipment probably enters the target cell at the same time because the target cell overlaps the virtual cell partly or completely. The user equipment performs intra-frequency measurement according to the pilot in the first signal, selects the virtual cell as a serving cell according to the frequency and scrambling code information of neighboring cells in neighboring cell information preset in the source cell, and obtains a location area code and an inter-frequency reselection threshold from the received first signal to determine whether to perform inter-frequency measurement and cell reselection. If determining that the location area code in the first signal is the same as the location area code of the source cell and the location area code of the target cell, the user equipment performs inter-frequency cell reselection according to the inter-frequency reselection threshold in the first common channel information. The user equipment selects a cell, which can provide services and is formed by coverage of the third signal transmitted by the base station of the target cell, as a residing cell of the user equipment.

Note that an intra-frequency measurement threshold needs to be set for the base station in the source cell, and serves as a basis for choosing, according to a measurement result of the user equipment for a network side, whether to perform intra-frequency measurement and cell reselection after the user equipment receives the intra-frequency measurement threshold sent by the base station in the source cell. Understandably, the user equipment performs the intra-frequency measurement in real time in general. Moreover, an inter-frequency measurement threshold needs to be set for the base station in the virtual cell, and serves as a basis for choosing, according to the location area code and the measurement result of the user equipment for the network side, whether to perform inter-frequency measurement and cell reselection after the user equipment receives the inter-frequency measurement threshold sent by the base station in the virtual cell. Generally, both an intra-frequency measurement threshold and an inter-frequency measurement threshold are set for the base station in each cell, and, according to the result of measuring the network side, the user equipment selects the measurement to be performed. In this embodiment, the user equipment may perform the intra-frequency measurement and cell reselection in the source cell in real time. After reselecting the virtual cell, the user equipment may perform inter-frequency measurement and reselect the target cell according to the location area code and the inter-frequency measurement threshold. The base station of the virtual cell may be the same as the base station of the target cell, that is, both are a Femtocell base station.

In the embodiment of the present invention, a base station of a virtual cell transmits a signal including common channel information, a frequency of the signal of the virtual cell is the same as a frequency of a signal transmitted by a base station of a source cell, the common channel information includes a pilot, a location area code and an inter-frequency reselection threshold, and the content of the common channel information guides user equipment to reside in a target cell through reselection. Moreover, in the embodiment of the present invention, a signal including common channel information is employed. Because this signal is a broadcast signal and is different from a pseudo pilot, the co-channel interference caused by the signal onto the source cell is small, and the interference onto normal services of the source cell is reduced. Massive configuration of base stations in the source cell is also avoided.

Further, different virtual cells may have the same configuration. For example, the frequency and the scrambling code of the signals transmitted by different virtual cells may be the same, where the frequency is the same as the frequency of the signal transmitted by the base station of the source cell. In the signals transmitted by different virtual cells, the configuration about common channel information differs and, specifically, may differ in the inter-frequency neighboring cell information of the virtual cell included in the common channel information, that is, the inter-frequency neighboring cell information of each virtual cell corresponds to a different target cell. The user equipment that enters the virtual cell reselects the corresponding target cell according to the inter-frequency neighboring cell information included in the common channel information of the virtual cell.

Figure 2:
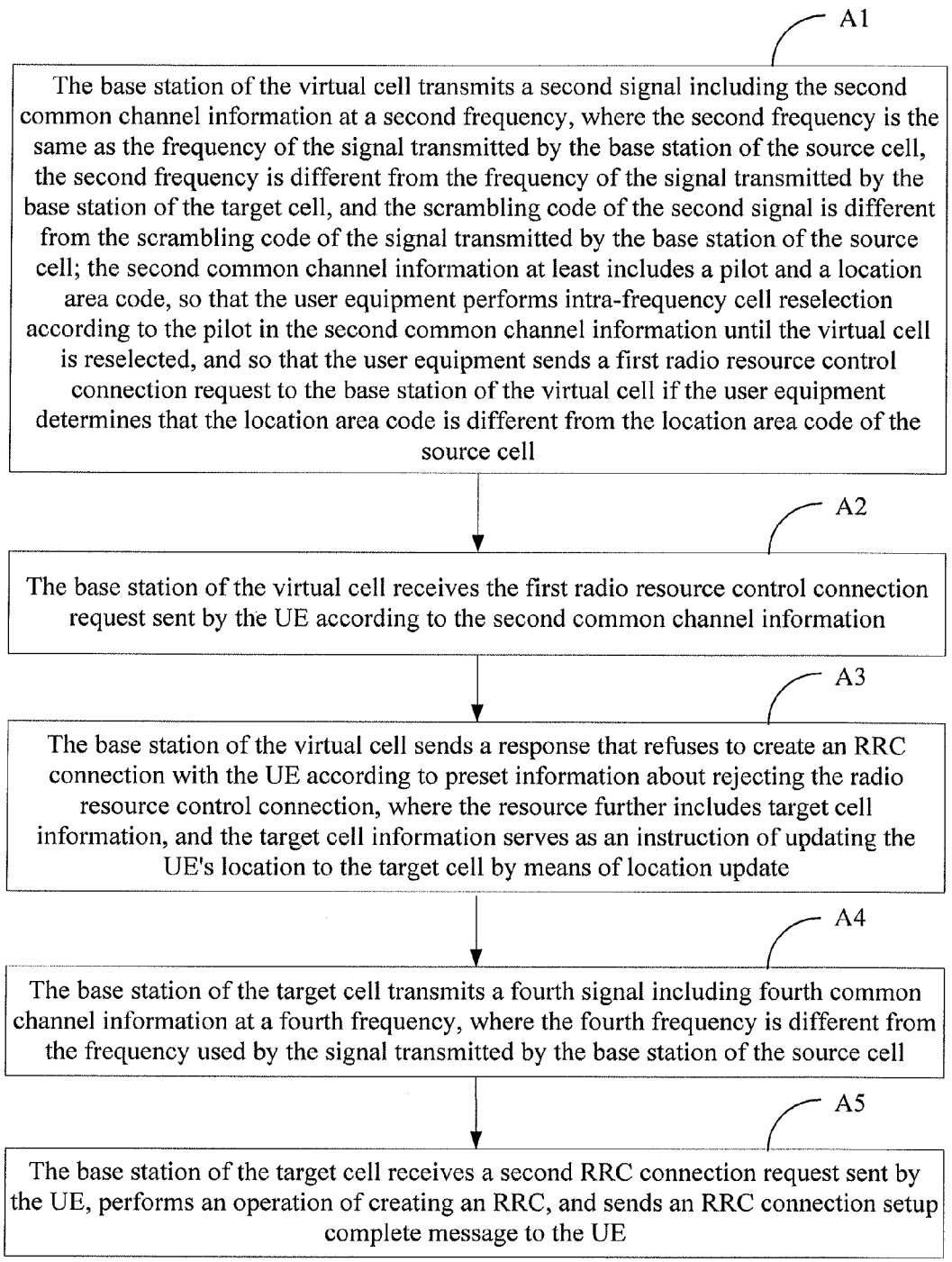
FIG. 2 is a flowchart of another method for controlling user equipment's residing in a cell according to an embodiment of the present invention.

FIG. 2 is a flowchart of a method for controlling user equipment's residing in a cell according to an embodiment of the present invention. The method includes the following steps:

Step A1: The base station of the virtual cell transmits a second signal including the second common channel information at a second frequency, where the second frequency is the same as the frequency of the signal transmitted by the base station of the source cell, the second frequency is different from the frequency of the signal transmitted by the base station of the target cell, and the scrambling code of the second signal is different from the scrambling code of the signal transmitted by the base station of the source cell; the second common channel information at least includes a pilot and a location area code, so that the user equipment performs intra-frequency cell reselection according to the pilot in the second common channel information until the virtual cell is reselected, in which the reselection may be specifically performed according to preset intra-frequency reselection rules after the strength of the pilot in the received second common channel information is measured, and so that the user equipment sends a first radio resource control connection request to the base station of the virtual cell if the user equipment determines that the location area code is different from the location area code of the source cell.

In step A1, the location area code in the second common channel information is different from the location area code of the source cell, and therefore, the user equipment initiates a radio resource control (RRC, Radio Resource Control) connection to the base station of the virtual cell if the user equipment determines that the location area code of the virtual cell is different from that of the source cell.

Step A2: The base station of the virtual cell receives the first radio resource control (RRC, Radio Resource Control) connection request sent by the user equipment according to the second common channel information.

Step A3: The base station of the virtual cell sends a response that refuses to create an RRC connection with the user equipment according to preset information about rejecting the radio resource control connection, where the response further includes target cell information, and the target cell information serves as an instruction of updating the user equipment's location to the target cell by means of location update (LAU, Location Area Update).

When the user equipment enters the virtual cell from the source cell, the user equipment performs intra-frequency measurement and reselects the virtual cell. According to the second common channel information included in the second signal received, the user equipment obtains the location area code (LAC, Location Area Code) of the virtual cell from the second common channel information, and determines that the LAC of the virtual cell is different from the LAC of the source cell of the user equipment, and therefore, the user equipment initiates an RRC connection to the virtual cell, that is, sends an RRC connection request. In the method shown in FIG. 1, the LAC in the first common channel information sent by the base station of the virtual cell is the same as the LAC of the source cell of the user equipment, which will not make the user equipment initiate an RRC connection. In other words, the two methods shown in FIG. 1 and FIG. 2 respectively configure different LAC parameters for the virtual cell. After receiving the first RRC connection request, the base station of the virtual cell refuses to create an RRC connection with the user equipment, and sends a response that refuses to create an RRC connection with the user equipment. Therefore, the user equipment fails to create an RRC connection with the virtual cell. According to the target cell information included in the response that refuses to create an RRC connection with the user equipment, where the target cell information serves as an instruction of updating the user equipment's location to the target cell, the user equipment sends an RRC connection request to the target cell. The base station of the target cell may be the same as or different from the base station of the virtual cell. If they are different base stations, the two base stations may share a site. Generally, the coverage areas of the two base stations overlap to some extent.

Preferably, the method may further include:

Step A4: The base station of the target cell transmits a fourth signal including fourth common channel information at a fourth frequency, where the fourth frequency is different from the frequency used by the source cell.

Step A5: The base station of the target cell receives a second RRC connection request sent by the user equipment, performs an operation of creating an RRC, and sends an RRC connection setup complete message to the user equipment.

Note that the first radio resource control connection request sent by the user equipment is used to initiate setup of a radio resource control connection between the user equipment and the virtual cell; the second radio resource control connection request sent by the user equipment is used to initiate setup of a radio resource control connection between the user equipment and the target cell.

After failing to set up an RRC connection with the virtual cell, the user equipment sends a second RRC connection request to the target cell according to the target cell information sent by the base station of the virtual cell, and sets up an RRC connection with the target cell. The virtual cell and the target cell may be implemented by the same base station and, specifically, both may be implemented by a Femtocell base station.

By setting up the RRC connection with the target cell, the user equipment updates its location to the target cell, thereby residing in the target cell.

Based on the description on the method for controlling user equipment's residing in a cell as shown in FIG. 2, a base station of a virtual cell transmits a signal including common channel information, a frequency of the signal of the virtual cell is the same as a frequency of a signal transmitted by a base station of a source cell, the common channel information includes a pilot and a location area code, and the content of the common channel information guides user equipment to reside in a target cell by performing a location update operation. Moreover, in the embodiment of the present invention, a signal including common channel information is employed. Because this signal is a broadcast signal and is different from a pseudo pilot, the co-channel interference caused by the signal onto the source cell is small, and the interference onto normal services of the source cell is reduced. Massive configuration of base stations in the source cell is also avoided.

Figure 3:
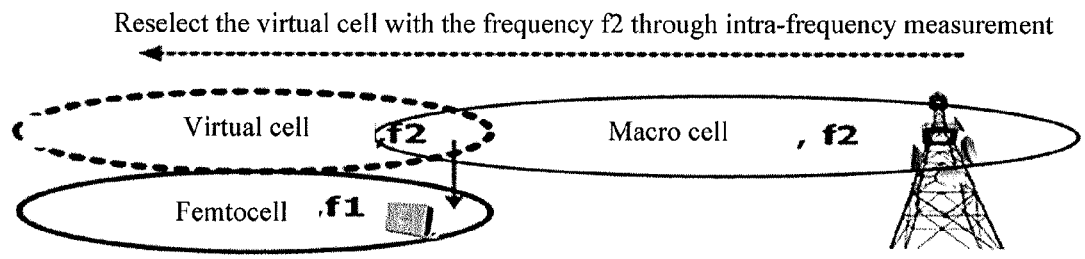
FIG. 3 is a schematic diagram of cell coverage when user equipment moves from a macro cell to a Femtocell.

Based on the description on a method for controlling user equipment's residing in a cell as shown in FIG. 1 and FIG. 2, while the user equipment moves from a source cell to a target cell, if the source base station is a macro base station and both the base station of the virtual cell and the base station of the target cell are the same Femtocell base station, the method may be specifically: As shown in FIG. 3, while the user equipment moves from the macro cell to the Femtocell, the Femtocell base station, which may be a home base station, transmits a signal including common channel information on a frequency f2. The frequency f2 is the same as the frequency used by the macro cell. The home base station cannot provide services for the user equipment on this frequency, but the home base station can provide services for the user equipment on another frequency such as f1 that is different from the frequency used by the macro cell. On the virtual cell formed by coverage of the signal transmitted on the frequency f2 that is the same as the frequency used by the macro cell, the Femtocell base station controls the user equipment to perform intra-frequency measurement and cell reselection to reselect the virtual cell; the Femtocell base station controls the user equipment to perform inter-frequency reselection or send an RRC connection request to the Femtocell base station, whereby the user equipment reselects the target cell or updates its location to the target cell. The target cell is a cell formed by the coverage of the signal transmitted by the Femtocell base station on the frequency f1. As regards how the virtual cell guides the user equipment to reselect the virtual cell, the guiding operation is not limited to the description in FIG. 1 and FIG. 2. The operations given as an example above are not exhaustive.

Figure 4:
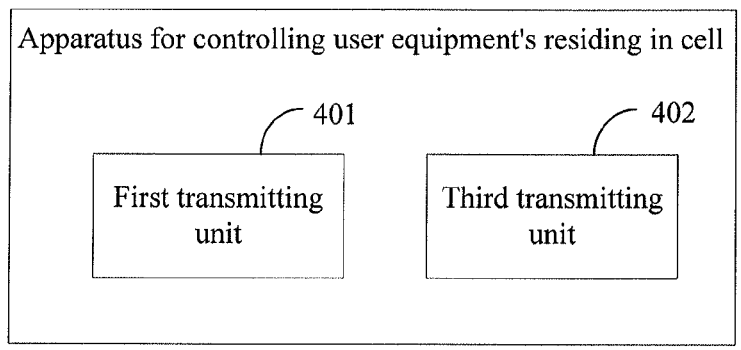
FIG. 4 is a schematic diagram of an apparatus for controlling user equipment's residing in a cell according to an embodiment of the present invention.

FIG. 4 is a schematic diagram of an apparatus for controlling user equipment's residing in a cell according to an embodiment of the present invention. The apparatus applies to a communication system including a source cell and a target cell, and the apparatus includes a first transmitting unit 401.

The first transmitting unit 401 is configured to transmit a first signal including first common channel information at a first frequency, where the first frequency is the same as a frequency of a signal transmitted by a base station of the source cell, the first frequency is different from a frequency of a signal transmitted by a base station of the target cell, and a scrambling code of the first signal is different from a scrambling code of the signal transmitted by the base station of the source cell; the first common channel information at least includes a pilot, a location area code, and inter-frequency reselection threshold, so that the user equipment performs intra-frequency cell reselection according to the pilot in the first common channel information until a cell formed by coverage of the first signal transmitted by the apparatus is reselected, and so that the user equipment performs inter-frequency cell reselection according to the inter-frequency reselection threshold in the first common channel information until the target cell is reselected if the user equipment determines that the location area code is the same as a location area code of the source cell and a location area code of the target cell.

With the apparatus in the embodiment of the present invention, a signal including common channel information is transmitted, a frequency of a signal of a virtual cell is the same as a frequency of a signal transmitted by a base station of a source cell, the common channel information includes a pilot, a location area code and an inter-frequency reselection threshold, and the content of the common channel information guides user equipment to reside in a target cell through reselection. Moreover, in the embodiment of the present invention, a signal including common channel information is employed. Because this signal is a broadcast signal and is different from a pseudo pilot, the co-channel interference caused by the signal onto the source cell is small, and the interference onto normal services of the source cell is reduced. Massive configuration of base stations in the source cell is also avoided.

Further, the apparatus is a Femtocell base station or a home base station, and the apparatus and the base station of the target cell may be the same base station or different base stations.

Further, the apparatus is a Femtocell base station or a home base station, and the apparatus and the base station of the target cell share a site.

The apparatus may further include: a third transmitting unit 402, configured to transmit a third signal including third common channel information at a third frequency, where the third frequency is different from a frequency used by the source cell.

With the third transmitting unit 402, the base station of the virtual cell can implement functions of the base station of the target cell. Therefore, the third transmitting unit 402 is only a preferred embodiment of the present invention rather than a necessary technical feature for solving technical problems of the present invention.

For more description about the apparatus in FIG. 4, refer to the base station of the virtual cell described in the method in FIG. 1.

Figure 5:
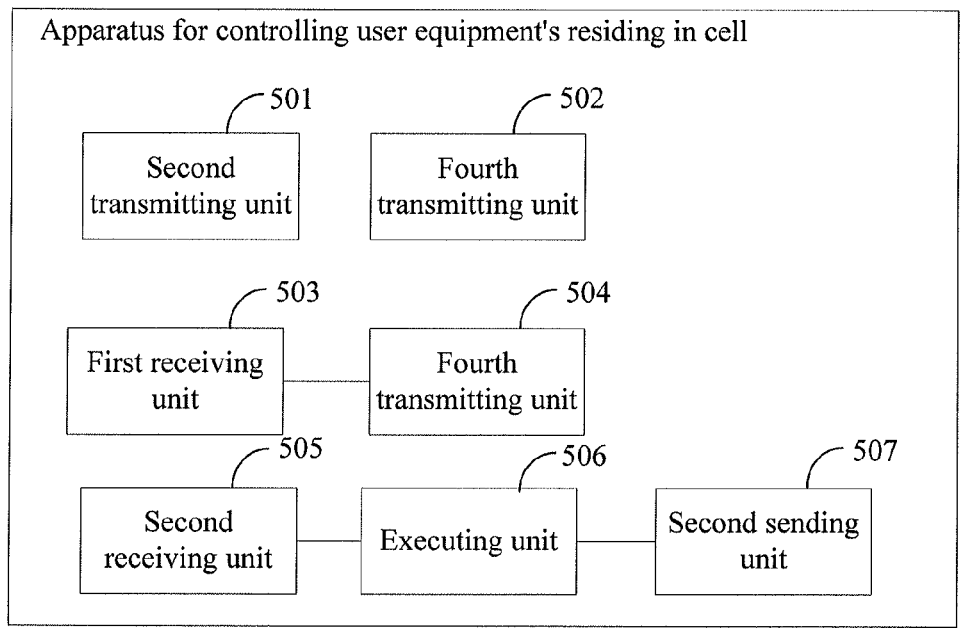
FIG. 5 is a schematic diagram of another apparatus for controlling user equipment's residing in a cell according to an embodiment of the present invention.

FIG. 5 is a schematic diagram of an apparatus for controlling user equipment's residing in a cell according to an embodiment of the present invention. Specifically, the apparatus may be a home base station. The apparatus includes a second transmitting unit 501, a first receiving unit 503, and a first sending unit 504.

The second transmitting unit 501 is configured to transmit a second signal including first common channel information at a second frequency, where the second frequency is the same as a frequency used by a source cell, the second frequency is different from a frequency of a signal transmitted by a base station of a target cell, and a scrambling code of the second signal is different from a scrambling code of a signal transmitted by a base station of the source cell; the second common channel information at least includes a pilot and a location area code, so that the user equipment performs intra-frequency cell reselection according to the pilot in the second common channel information until a cell formed by coverage of the second signal sent by the apparatus is reselected, and so that the user equipment sends a first radio resource control connection request to the apparatus if the user equipment determines that the location area code is different from a location area code of the source cell.

The first receiving unit 503 is configured to receive the first radio resource control connection request sent by the user equipment.

The first sending unit 504 is configured to send a response that refuses to create a radio resource control connection with the user equipment according to preset information about rejecting the radio resource control connection, where the response further includes target cell information, and the target cell information serves as an instruction of updating the user equipment's location to the target cell.

With the apparatus in the embodiment of the present invention, a signal including common channel information is transmitted, a frequency of a signal of a virtual cell is the same as a frequency of a signal transmitted by a base station of a source cell, the common channel information includes a pilot, a location area code and an inter-frequency reselection threshold or the common channel information includes a pilot and a location area code, and the content of the common channel information guides user equipment to reside in a target cell through a location update operation. Moreover, in the embodiment of the present invention, a signal including common channel information is employed. Because this signal is a broadcast signal and is different from a pseudo pilot, the co-channel interference caused by the signal onto the source cell is small, and the interference onto normal services of the source cell is reduced. Massive configuration in the source cell is also avoided.

Further, both the apparatus and the base station of the target cell are Femtocell base stations or home base stations; and the source cell is a macro cell.

Further, the apparatus and the base station of the target cell may be the same base station or different base stations.

Further, the apparatus and the base station of the target cell share a site.

The apparatus may further include a fourth transmitting unit 502, a second receiving unit 505, an executing unit 506, and a second sending unit 507.

The fourth transmitting unit 502 is configured to transmit a fourth signal including fourth common channel information at a fourth frequency, where the fourth frequency is different from a frequency used by the source cell.

The second receiving unit 505 is configured to receive an RRC connection request sent by the user equipment according to target cell information.

The executing unit 506 is configured to execute an operation of setting up an RRC connection.

The second sending unit 507 is configured to send an RRC connection setup complete message to the user equipment.

With the above units, the apparatus can implement functions of the base station of the target cell. Therefore, the fourth transmitting unit 502, the second receiving unit 505, the executing unit 506, and the second sending unit 507 are only preferred embodiments of the present invention rather than a necessary technical feature for solving technical problems of the present invention.

For more description about the apparatus in FIG. 5, refer to the description about the method in FIG. 2.

Persons of ordinary skill in the art should understand that all or a part of the steps of the method according to the embodiments may be implemented by a computer program instructing relevant hardware. The program may be stored in a computer readable storage medium. When the program is run, the steps of the method according to the embodiments are performed. The storage medium may be a magnetic disk, an optical disk, a Read-Only Memory (Read-Only Memory, ROM), a Random Access Memory (Read-Only Memory, RAM), and so on.

The present invention is described in the preceding embodiments. Several examples are used for illustration of the principles and implementation methods of the present invention. The description of these examples is used to help illustrate the method and its core principles in an embodiment of the present invention. Those skilled in the art can make various modifications and variations to the invention without departing from the spirit and principle of the invention. The invention is intended to cover the modifications and variations provided that they fall in the scope of protection defined by the invention.

What is claimed is:

1. A method for controlling user equipment's residing in a cell, applied in a communication system including a source cell, a virtual cell, and a target cell, the method comprising:

transmitting, by a base station of the virtual cell, a first signal including first common channel information at a first frequency, wherein the first frequency is the same as a frequency of a signal transmitted by a base station of the source cell, the first frequency is different from a frequency of a signal transmitted by a base station of the target cell, and a scrambling code of the first signal is different from a scrambling code of the signal transmitted by the base station of the source cell; and the first common channel information at least comprises a pilot of the virtual cell, a location area code, and inter-frequency reselection threshold, so that the user equipment performs intra-frequency cell reselection according to the pilot in the first common channel information until the virtual cell is reselected, and so that the user equipment performs inter-frequency cell reselection according to the inter-frequency reselection threshold in the first common channel information until the target cell is reselected if the user equipment determines that the location area code is the same as a location area code of the source cell and a location area code of the target cell.

2. The method according to claim 1, wherein:
the base station of the virtual cell is a Femtocell base station or a home base station;
the base station of the target cell is a Femtocell base station or a home base station; and
the source cell is a macro cell.

3. The method according to claim 2, wherein:
the base station of the target cell is the same as or different from the base station of the virtual cell.

4. The method according to claim 2, wherein:
the virtual cell and the target cell share a site.

5. A method for controlling user equipment's residing in a cell, applied in a communication system including a source cell, a virtual cell, and a target cell, the method comprising:

transmitting, by a base station of the virtual cell, a second signal including second common channel information at a second frequency, wherein the second frequency is the same as a frequency of a signal transmitted by a base station of the source cell, the second frequency is different from a frequency of a signal transmitted by a base station of the target cell, and a scrambling code of the second signal is different from a scrambling code of the signal transmitted by the base station of the source cell;

the second common channel information at least comprises a pilot of the virtual cell and a location area code, so that the user equipment performs intra-frequency cell reselection according to the pilot in the second common channel information until the virtual cell is reselected, and so that the user equipment sends a first radio resource control connection request to the base station of the virtual cell if the user equipment determines that the location area code is different from a location area code of the source cell;

receiving, by the base station of the virtual cell, the first radio resource control connection request sent by the user equipment; and sending, by the base station of the virtual cell, a response that refuses to create a radio resource control connection with the user equipment according to preset information about rejecting the radio resource control connection, wherein the response further comprises target cell information, and the target cell information serves as an instruction of updating the user equipment's location to the target cell.

6. The method according to claim 5, wherein the base station of the virtual cell is a Femtocell base station or a home base station; the base station of the target cell is a Femtocell base station or a home base station; and
the source cell is a macro cell.

7. The method according to claim 6, wherein:
the base station of the virtual cell is the same as or different from the base station of the target cell.

8. The method according to claim 6, wherein:
the virtual cell and the target cell share a site.

9. An apparatus for controlling user equipment's residing in a cell, applied in a communication system including a source cell and a target cell, the apparatus comprising:

a first transmitting unit, configured to transmit a first signal including first common channel information at a first frequency, wherein the first frequency is the same as a frequency of a signal transmitted by a base station of the source cell, the first frequency is different from a frequency of a signal transmitted by a base station of the target cell, and a scrambling code of the first signal is different from a scrambling code of the signal transmitted by the base station of the source cell; and the first common channel information at least comprises a pilot of a virtual cell, a location area code, and inter-frequency reselection threshold, so that the user equipment performs intra-frequency cell reselection according to the pilot in the first common channel information until a cell formed by an area covered by the first signal sent by the apparatus is reselected, and so that the user equipment performs inter-frequency cell reselection according to the inter-frequency reselection threshold in the first common channel information until the target cell is reselected if the user equipment determines that the location area code is the same as a location area code of the source cell and a location area code of the target cell.

10. The apparatus according to claim 9, wherein the apparatus is a Femtocell base station or a home base station; the base station of the target cell is a Femtocell base station or a home base station; and the source cell is a macro cell.

11. The apparatus according to claim 10, wherein:

the apparatus and the base station of the target cell are the same base station or different base stations.

12. The apparatus according to claim 10, wherein:

the apparatus and the base station of the target cell share a site.

13. An apparatus for controlling user equipment's residing in a cell, applied in a communication system including a source cell and a target cell, the apparatus comprising:

a second transmitting unit, configured to transmit a second signal including second common channel information at a second frequency, wherein the second frequency is the same as a frequency of a signal transmitted by a base station of the source cell, the second frequency is different from a frequency of a signal transmitted by a base station of the target cell, and a scrambling code of the second signal is different from a scrambling code of the signal transmitted by the base station of the source cell;

the second common channel information at least comprises a pilot of a virtual cell and a location area code, so that the user equipment performs intra-frequency cell reselection according to the pilot in the second common channel information until a cell formed by an area covered by the second signal sent by the apparatus is reselected, and so that the user equipment sends a first radio resource control connection request to the apparatus if the user equipment determines that the location area code is different from a location area code of the source cell;

a first receiving unit, configured to receive the first radio resource control connection request sent by the user equipment; and a first sending unit, configured to send a response that refuses to create a radio resource control connection with the user equipment according to preset information about rejecting the radio resource control connection, wherein the response further comprises target cell information, and the target cell information serves as an instruction of updating the user equipment's location to the target cell.

14. The apparatus according to claim 13, wherein the apparatus is a Femtocell base station or a home base station; the base station of the target cell is a Femtocell base station or a home base station; and the source cell is a macro cell.

15. The apparatus according to claim 14, wherein:

the apparatus and the base station of the target cell may be the same base station or different base stations.

16. The apparatus according to claim 14, wherein:

the apparatus and the base station of the target cell share a site.

* * * * *